United States Patent [19]

Hall

[11] Patent Number: 5,518,259

[45] Date of Patent: May 21, 1996

[54] LATERAL STABILIZER FOR TWO-WHEELED VEHICLES

[76] Inventor: Robert J. Hall, 7863 SVL Box, Victorville, Calif. 92392

[21] Appl. No.: 112,578

[22] Filed: Aug. 25, 1993

[51] Int. Cl.$^6$ .................................... B62H 1/12
[52] U.S. Cl. ...................... 280/43.2; 280/302; 280/755; 280/767
[58] Field of Search ............... 180/21; 280/767, 280/43.2, 299, 300, 301, 302, 763.1, 764.1, 755, 727

[56] References Cited

U.S. PATENT DOCUMENTS

| | | | |
|---|---|---|---|
| 1,055,581 | 3/1913 | Webb | 280/296 |
| 2,893,019 | 7/1959 | Renfroe et al. | 280/43.2 X |
| 3,143,749 | 8/1964 | Buchholz et al. | 280/43.2 X |
| 3,362,726 | 1/1968 | Bell | 280/303 |
| 3,700,059 | 10/1972 | Sutton | 280/43.2 X |
| 3,752,496 | 8/1973 | Meinecke, Jr. | 280/81.1 |
| 4,513,837 | 4/1985 | Archer | 180/209 |
| 4,812,044 | 3/1989 | Christenson | 280/767 X |
| 4,826,194 | 5/1989 | Sakita | 280/302 |
| 5,029,894 | 7/1991 | Willman | 280/755 |

FOREIGN PATENT DOCUMENTS

| | | | |
|---|---|---|---|
| 2467133 | 10/1979 | France . | |
| 2104464 | 5/1983 | United Kingdom | 280/767 |
| 2174656 | 11/1986 | United Kingdom . | |

OTHER PUBLICATIONS

"Polio No Barrier For Keith Van Patter" by B. Burner from *American Motocyclist*, pp. 40–41; Aug. 1993.

*Primary Examiner*—Margaret A. Focarino
*Assistant Examiner*—Michael Mar
*Attorney, Agent, or Firm*—Sheldon & Mak

[57] ABSTRACT

A system for laterally stabilizing a two-wheeled vehicle includes a pair of outrigger struts having respective outrigger wheels on opposite sides of the rear wheel, vertically movable between raised and lowered positions relative to a supporting structure, the struts each being connected by a transverse strut shaft for unison vertical movement and extending forwardly of the strut shaft; an electric motor driven actuator mechanism including a rotatably mounted lead screw shaft that is pivotably mounted relative to the supporting structure, a drive nut threadingly engaging the lead screw shaft that is connected to the strut shaft for driving the wheels between the raised and lowered positions in response to rotation of the lead screw shaft. A controller for electrically powering the motor includes pilot circuit paths of a bidirectional motor bridge circuit, the pilot circuit paths being electrically powered only when motive power of the vehicle is enabled, the actuator mechanism in combination with the motor having sufficient drag and mechanical advantage whereby the outrigger wheels are locked from movement between the raised and lowered positions in the absence of electrical power to the motor. Limit switches are connected for inhibiting corresponding ones of the pilot circuit paths for preventing overtravel of the outrigger wheels.

10 Claims, 3 Drawing Sheets

LATERAL STABILIZER FOR TWO-WHEELED VEHICLES

BACKGROUND

The present invention relates to two wheeled vehicles such as motorcycles and the like, and more particularly to devices for laterally stabilizing such vehicles.

Traditionally, two-wheeled vehicles have been laterally stabilized for parking or storage by a kick-stand, which can prop up the vehicles as it leans against a folding leg of the stand. In the case of heavier motorcycles, the stand is laterally symmetrical and folds longitudinally. Such stands are difficult to use, particularly by smaller riders of the heavy motorcycles. Also, such stands impart heavy load concentrations on pavement such as asphalt, which gets soft on hot days which can cause a heavy motorcycle to fall over when the bottom extremity of the stand digs into the pavement. Moreover, the motorcycle is raised significantly above normal riding height when parking thus further contributing to instability.

Other stabilizer devices of the prior art include outrigger wheels that are powered for raising and lowering thereof when the vehicle is either moving or at rest. For example, Archer U.S. Pat. No. 4,513,837 discloses outrigger wheels that hydraulically retract into wheel wells of a motorcycle body portion, a mechanical spring otherwise urging the wheels into contact with a roadway surface. Among the disadvantages of the Archer device is the possibility of internal hydraulic leakage following retraction of the wheels, resulting in unwanted lowering of the wheels, especially on long trips, unless the hydraulic system is continuously or periodically activated. Also, the load-carrying capacity of the outrigger wheel is limited by the mechanical spring, which must be overcome by the hydraulic system when the wheels are raised.

Willman U.S. Pat. No. 5,029,894 discloses hydraulically activated motorcycle outrigger wheels that lock in place when down at each side of the motorcycle for stop-and-start driving, parking, and for handling while not being ridden. Unfortunately, the device of Willman is excessively complex and expensive to provide, while being subject to shortcomings in common with all hydraulic systems, such as external leakage. Further, the device of Willman is bolted to a frame of the motorcycle ahead of the rear wheel, making the device unsuitable for use on many motorcycles, and at least potentially compromising needed frame strength of the motorcycle by requiring holes to be drilled in the frame.

Thus there is a need for a lateral stabilizer for two-wheeled vehicles that avoids the shortcomings of hydraulic systems, while providing an inexpensive alternative.

SUMMARY

The present invention meets this need by providing a system for laterally stabilizing a two-wheeled vehicle having a steerable front wheel, a rear wheel, and a supporting structure connecting the front and rear wheels. The system includes a pair of outrigger struts having respective outrigger wheels rotatably mounted thereto in parallel spaced relation on opposite sides of the rear wheel, the outrigger wheels being vertically movably positionable between a raised position and a lowered position relative to the supporting structure; an electric motor supported by the supporting structure; an actuator mechanism including a rotatably mounted lead screw shaft operatively coupled to the motor for being driven thereby, a drive nut member threadingly engaging the lead screw shaft, and the lead screw shaft and the drive nut member being connected between the struts and the supporting structure for driving the wheels between the raised and lowered positions in response to rotation of the lead screw shaft; and a controller for electrically powering the electric motor for selectively positioning the outrigger wheels.

The struts can be each rigidly connected by a laterally oriented strut shaft, the strut shaft being rotatably mounted transversely relative to the supporting structure for providing in unison vertical movement of the outrigger wheels. The strut shaft can extend behind the rear wheel on opposite sides thereof, the struts extending forwardly of the strut shaft.

The drive nut member can be pivotally mounted on a crank arm that is operatively connected to the struts for movement thereof. The lead screw shaft can be pivotably mounted relative to the supporting structure. The system can further include a rotatably mounted drive shaft operatively coupled to the motor for drive thereby, the pivotable mounting of the lead screw shaft including a universal joint rotatably coupling the lead screw shaft to the drive shaft, the lead screw shaft also being driven by the drive shaft. The motor is coupled to the drive shaft by a chain reduction drive. The rear wheel can be dynamically suspended relative to the supporting structure.

Preferably the controller includes first and second momentary pilot circuit paths for powering respective first and second gain circuits that are operatively connected for reversibly powering the motor from a D.C. source of electrical power in response to activation of corresponding ones of the circuit paths, the outrigger wheels being lowered by activation of the first pilot circuit path and raised by activation of the second pilot circuit path; and first and second limit switch elements for interrupting corresponding ones of the pilot circuit paths, the first limit switch element being opened when the outrigger wheels reach the lowered position, the second limit switch element being opened when the outrigger wheels reach the raised position, the limit switch elements being connected for inhibiting corresponding ones of the pilot circuit paths for preventing overtravel of the outrigger wheels. The vehicle can be powered by a vehicle drive for transport thereof, the pilot circuit paths being electrically powered only when the vehicle drive is enabled, the actuator mechanism in combination with the motor having sufficient drag and mechanical advantage whereby the outrigger wheels are locked from movement between the raised and lowered positions in the absence of electrical power to the motor.

DRAWINGS

These and other features, aspects, and advantages of the present invention will become better understood with reference to the following description, appended claims, and accompanying drawings, where:

DESCRIPTION

Figure 1:
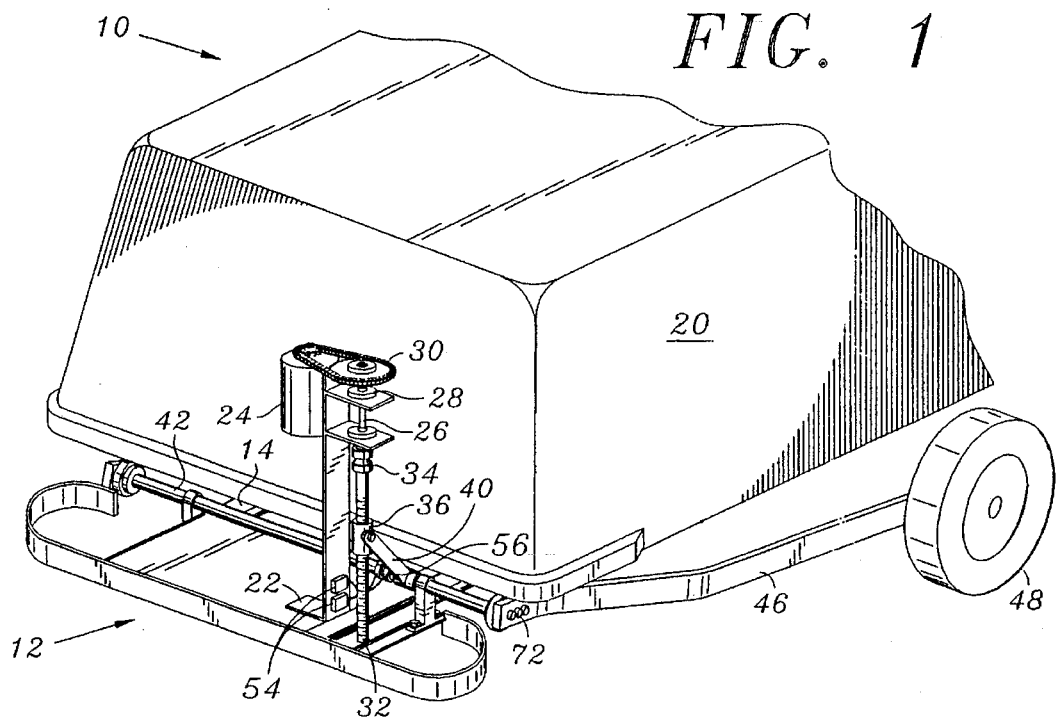
FIG. 1 is a rear oblique elevational perspective view of a tandem-wheeled-vehicle-mounted stabilizer system according to the present invention.
Figure 2:
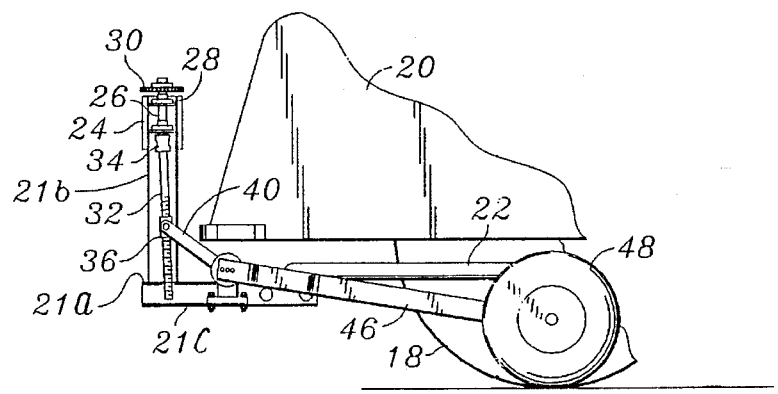
FIG. 2 is a right side elevational view of the system of FIG. 1, with outrigger wheels thereof in a lowered position.
Figure 3:
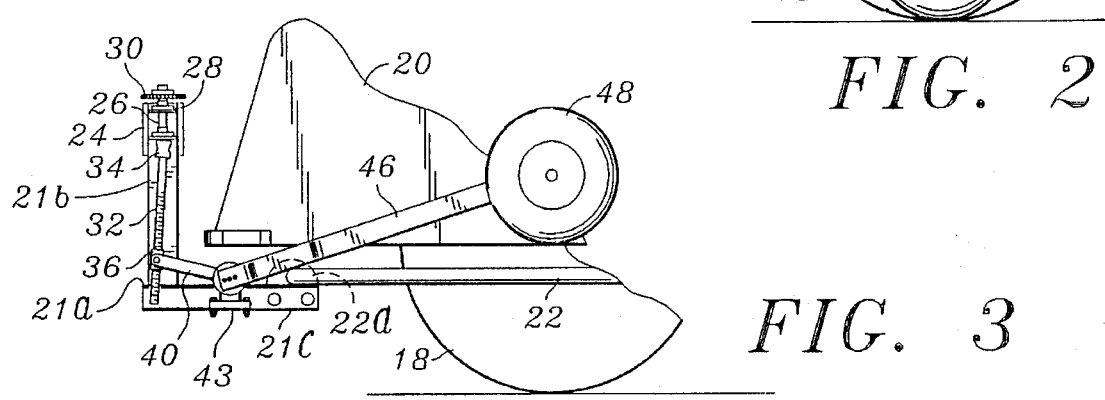
FIG. 3 is a right side elevational view as in FIG. 2, with the outrigger wheels in a raised position.
Figure 4:
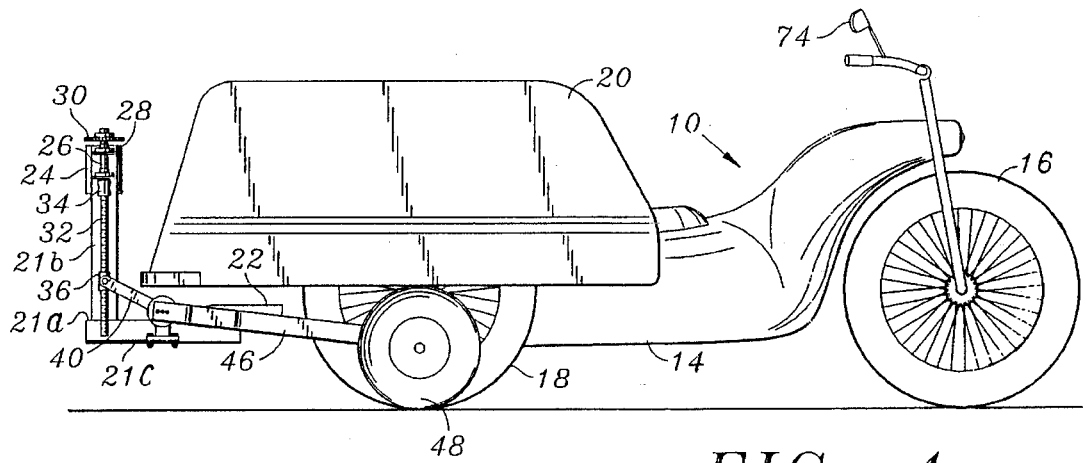
FIG. 4 is a right side elevational view showing the system of FIG. 1 installed on a motorcycle.
Figure 5:
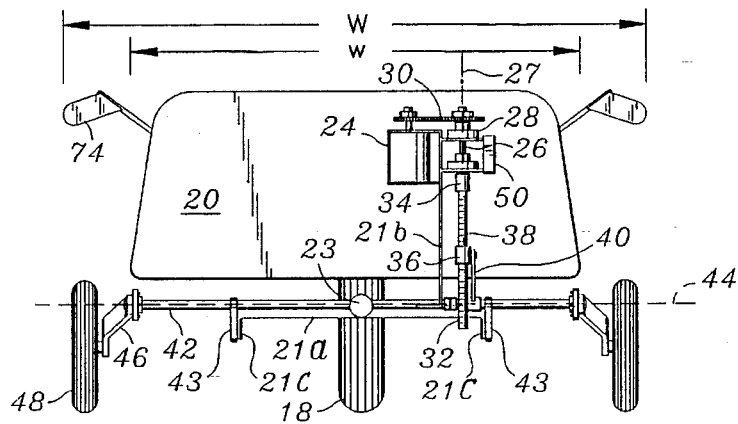
FIG. 5 is a rear elevational view of the motorcycle having the system of FIG. 1.
Figure 6:
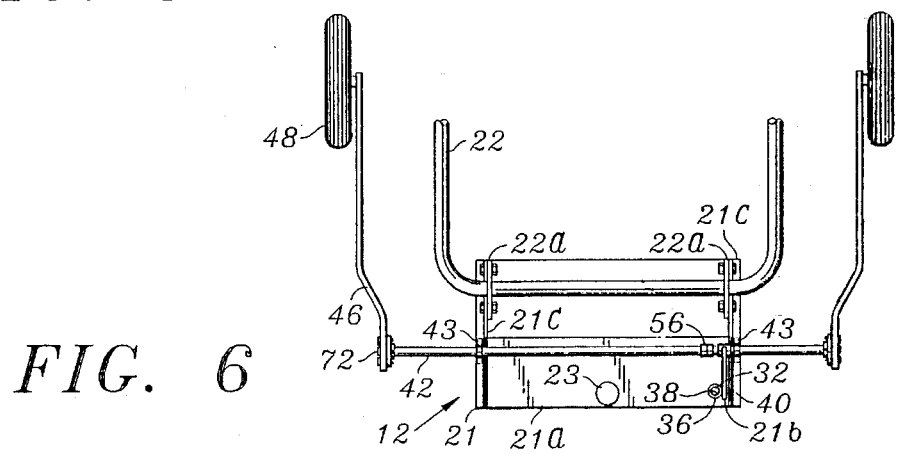
FIG. 6 is a sectional plan view of the system of FIG. 1.

The present invention is directed to a lateral stabilizer that is particularly inexpensive and effective for use on two-wheeled vehicles such as large, heavy motorcycles. With reference to the drawings, a vehicle 10 is provided with a stabilizer system 12 according to the present invention, the vehicle 10 having a chassis 14 that is rollably supported by a steerable front wheel 16 and a powered rear wheel 18, the chassis 14 typically including a body 20 that partially encloses the rear wheel 18, and having a lateral width w. An exemplary configuration of the system 12 includes a base 21 that is fixably connected to a frame 22 that is attached to the chassis 14, the frame 22 being of the type that conventionally supports an accessory trailer hitch 23. In the exemplary configuration described herein, the base 21 includes a shelf portion 21a, an upstanding column portion 21b that is welded to the shelf portion 21a, and a laterally spaced pair of forwardly extending angle members 21c that are bolted to a pair of flanges 22a that are welded to the frame 22. The column portion 21b of the base 21 supports a drive motor 24 and a drive shaft 26 that is rotatably mounted on a drive axis 27 by a pair of flange bearings 28, the shaft 26 being driven from the motor 24 by a reduction chain drive 30. An Acme threaded lead screw 32 is pivotally coupled to the drive shaft 26 for rotation therewith by a universal coupling 34, a nut member 36 being threadingly engaged with the lead screw 32 by means of a threaded insert 38, the insert 38 being preferably fabricated from a suitable plastic material such as Nylon®. The nut member 36 is pivotally connected to an actuation arm 40, the actuation arm 40 rigidly radially extending from an actuating shaft 42 that is rotatably supported by a pair of support bearings 43 that are mounted to the base 21 on the angle members 21c as best shown in FIG. 5. Thus the support bearings 43 define a lateral pivot axis 44 of the actuating shaft 42, the shaft 42 extending behind and on opposite sides of the rear wheel 18. A pair of forwardly extending strut arms 46 are rigidly connected proximate opposite ends of the actuating shaft 42, each of the strut arms 46 having an outrigger wheel 48 rotatably mounted thereto in spaced apart parallel relation to opposite sides of the rear wheel 18. Accordingly, the outrigger wheels 48 are capable of being driven generally vertically up and down at high mechanical advantage by appropriately powering the motor 24. Preferably the outrigger wheels make ground contact in lateral alignment with the rear wheel 18 for facilitating operation of the vehicle 10 over uneven road surfaces.

A suitable motor for use as the motor 24 is a conventional permanent magnet starter motor of the type used on tractors, available as Kohler part number 45 098 06, from United Technology of Columbus, Mich. The motor 24 can be mounted in electrical isolation from the base 21 for facilitating bidirectional operation thereof. Preferably, however, a pair of grounded brushes of the motor 24 are ungrounded and provided with a separate, isolated wiring terminal for permitting conventional mounting of the motor 24. The lead screw 32 can have a pitch of approximately 0.167 inch, and the chain drive 30 can have a reduction ratio of approximately 4 to 1, the strut arms 46 having an effective length L that is approximately four times an effective length of the actuation arm 40. The motor 24, the chain drive 30, and the drive shaft 26, together with an upper extremity of the column portion 21b, can be enclosed by a suitable protective housing (not shown).

Figure 7:
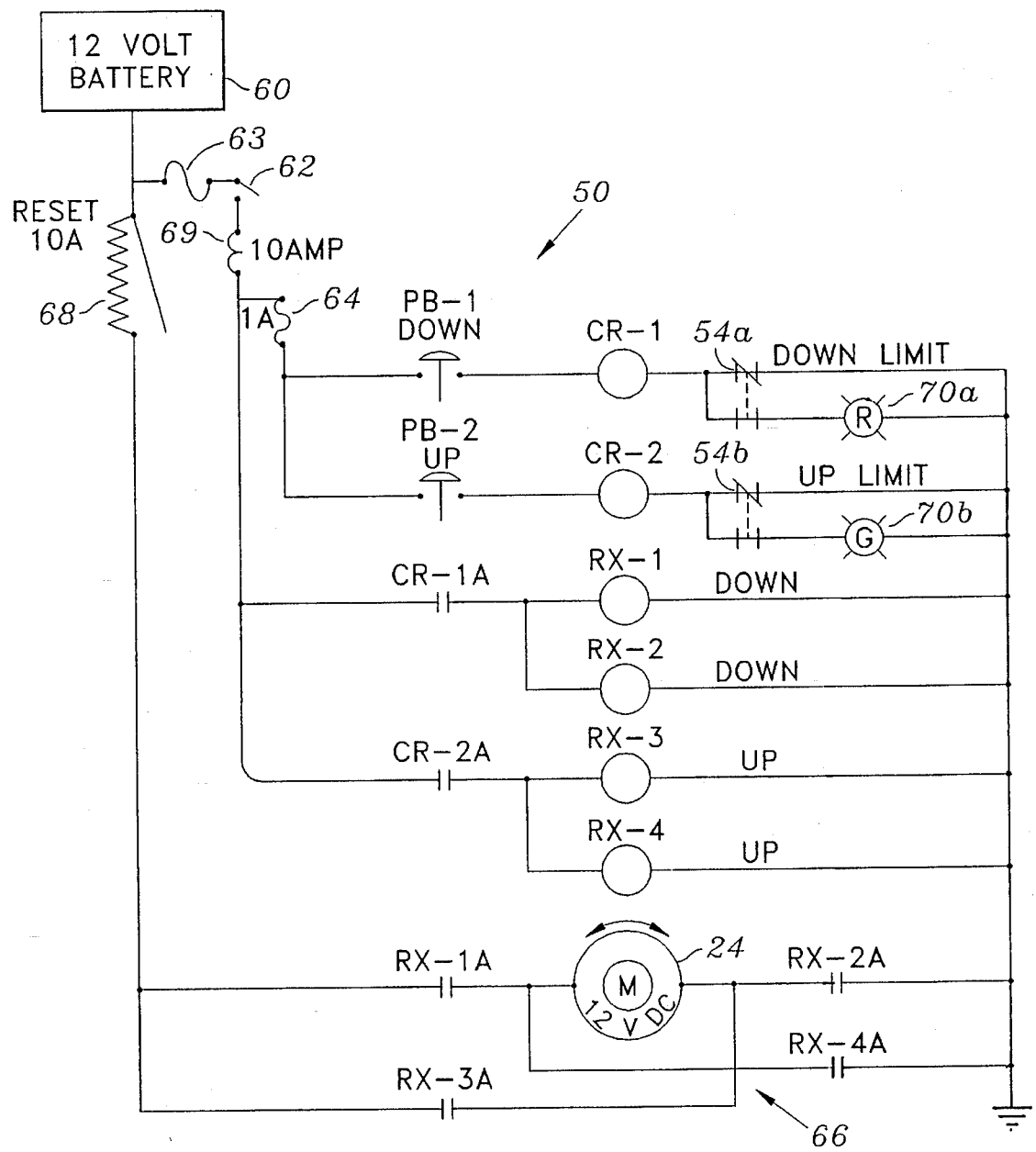
FIG. 7 is a schematic wiring diagram of the system of FIG. 1.

With particular reference to FIGS. 5 and 7, the system 12 also includes a control circuit 50 for powering the motor 24 in response to a pair of pilot switches PB-1,2 and a pair of limit switches 54 that are mechanically coupled for actuation thereof at respective raised and lowered travel extremities of the outrigger wheels 48. (The control system 50 is omitted from FIGS. 1–4 for clarity.) More particularly, a first limit switch 54a is activated by a first shaft collar and projecting set screw 56a that is adjustably mounted on the actuating shaft 42 for activating the first limit switch 54a when the outrigger wheels 48 are lowered, and a second limit switch 54b is activated by a second shaft collar and set screw 56b that is also mounted on the actuating shaft 42 for activating the second limit switch 54b when the outrigger wheels 48 are raised.

A first pilot switch PB-1 is series connected with a normally closed contact of the first limit switch 54a for activating the motor 24 by means of a first pilot relay CR-1. Similarly a second pilot switch PB-2 is series connected with a normally closed contact of the second limit switch 54b for activating the motor 24 by means of a second pilot relay CR-2, the pilot switches PB-1,2 being powered from a vehicle battery 60 through an ignition switch 62, and associated ignition fuse 63, that normally activates an engine (not shown) for powering the rear wheel 18. A pilot fuse 64 or other suitable current limiting device is also connected in series with the pilot switches PB-1,2. The pilot relays CR-1,2 are connected for activating pairs of driver relays RX-1,2 and RX-3,4 that connect the motor 24 in a bridge circuit 66 for bi-directionally powering the motor 24 from the battery 60. The motor 24 is powered through a circuit breaker 68 that is separately connected to the battery 60, the pilot relays CR-1,2 and the driver relays RX-1,2,3,4 being powered from the ignition switch 62 through a driver fuse 69. The pilot switch PB-1 can be located on or proximate a hand-operated brake control (not shown) for facilitating downward actuation of the outrigger wheels 48 in conjunction with the brake control. Similarly, the pilot switch PB-2 can be located for facilitating upward actuation of the outrigger wheels 48 in conjunction with a clutch control of the vehicle 10. A pair of limit indicators 70, respectively designated down limit indicator 70a and up limit indicator 70b, are powered through corresponding normally open contacts of the limit switches 54a and 54b for visually indicating the lowered and raised positions of the outrigger wheels 48.

An experimental prototype of the system 12 has been built as described above and tested on a 1988 Honda GL1500/6 motorcycle. The time required for activation of the outrigger wheels 48 of the experimental prototype from the raised position to the lowered position is approximately one second. Similarly, movement from the lowered position to the raised position is also approximately one second. The testing showed that a large motorcycle equipped with the stabilizer system 12 is particularly secure against rollover when parked, because the entire load is supported on tires rather than being concentrated on asphalt which softens on hot days, and because the motorcycle sits much lower that it would on a stand. The lower parked position also facilitates rider mounting.

It has also been discovered that one person can easily maneuver a large motorcycle having the stabilizer system 12 around in a garage or on a driveway, with greatly reduced danger of overturning the motorcycle. The system 12 of the present invention has proven effective in low speed maneuvering such as in parking lots between cars and in stop and go traffic which is typically the most difficult environment for holding the motorcycle in a stable, upright position. The system 12 also is effective for safely negotiating slick spots such as ice, gravel, sand, or other road hazards with greatly reduced risk of the motorcycle falling on its side. The Honda GL1500 motorcycle is equipped with reverse, and it has been further discovered that the stabilizer system 12 is particularly effective when backing out of a head in parking space or incline. Normally, operation of the motorcycle with the outrigger wheels 48 in the lowered position would be at low speeds on the order of 5 mph or less.

It has been discovered further that a slight degree of flexibility is desired in the support for the outrigger wheels 48, for more easily traversing uneven ground. Accordingly, a preferred configuration of the system 12 has the actuating shaft 42 formed of steel having a diameter of 1.00 inch, the shaft 42 deflecting slightly in bending outward of the bearings 43, and in torsion on opposites of the actuation arm 40.

As shown in the drawings, the activating shaft 42, together with respective end mountings 72 of the struts 46, are confined within the width w of the body 20 for facilitating maneuvering of the vehicle 10 around obstacles, etc., the struts 46 being laterally offset for clearing the body 20 in the raised position of the outrigger wheels 48, the wheels 48 being spaced slightly on opposite sides of the body 20 for enhancing stability of the vehicle 10 in the lowered position of the wheels 48. However, the system 12, including the outrigger wheels 48, is confined within an overall width W of the vehicle 10 that includes a pair of rear view mirrors 74 of the vehicle 10. Preferably, at least one of the strut end mountings 72 is adjustable relative to the actuating shaft 42 for laterally leveling the vehicle 10 in the lowered position of the outrigger wheels 48 relative to ground contacts of the outrigger wheels 48.

The stabilizer 12 of the present invention provides a particularly stable support for the vehicle 10 in the lower position of the outrigger wheels 48, allowing a rider and passenger to step up on foot pegs and then stride the motorcycle, thus making mounting and dismounting much easier. In the raised position of the outrigger wheels 48 there is enhanced ground clearance because the wheels 28 are not required to remain within wheel wells of the body 20, being raised along side the body 20. Also, the actuating shaft 42 is preferably made shorter than the width W of the body, the strut arms 46 being offset for clearing the body 20 in the raised position of the outrigger wheels 48 for permitting the motorcycle to be freely banked in turns without the end mountings 72 striking the ground.

Although the present invention has been described in considerable detail with reference to certain preferred versions thereof, other versions are possible. For example, the limit indicators 70 can be powered independently of the ignition switch 62. Therefore, the spirit and scope of the appended claims should not necessarily be limited to the description of the preferred versions contained herein.

What is claimed is:

1. A system for laterally stabilizing a two-wheeled vehicle having a steerable front wheel, a rear wheel, and a chassis connecting the front and rear wheels, the system comprising:

(a) a support structure including a U-shaped frame member having leg portions rigidly attached to the vehicle chassis and a transverse portion located rearwardly of the rear wheel, a base member, and means for rigidly attaching the base member to the transverse portion of the frame member to form a substantially horizontal shelf portion extending rearwardly of the rear wheel;

(b) a laterally oriented strut shaft rotatably mounted transverse to the base member behind the rear wheel and extending on opposite sides thereof;

(c) a pair of outrigger struts having respective outrigger wheels rotatably mounted at forward ends thereto, the struts being rigidly connected at their rearward ends to the strut shaft for locating the outrigger wheels in parallel spaced relation on opposite sides of the rear wheel, the outrigger wheels being vertically movably positionable between a raised position and a lowered position relative to the base member;

(d) an electric motor supported by the base member;

(e) an actuator mechanism comprising:

(i) a rotatably mounted lead screw shaft operatively coupled to the motor for being driven thereby;

(ii) a drive nut member threadingly engaging the lead screw shaft; and (iii) the lead screw shaft and the drive nut member being mechanically connected between the strut shaft and the motor for driving the strut shaft and thereby pivoting the struts and the outrigger wheels in unison between the raised and lowered positions in response to rotation of the lead screw shaft; and (f) a controller for electrically powering the electric motor for selectively positioning the outrigger wheels.

2. The system of claim 1, wherein the drive nut member is pivotally mounted on a crank arm, the crank arm being rigidly connected to the strut shaft for movement thereof.

3. The system of claim 2, wherein the lead screw shaft is pivotably mounted relative to the base member.

4. The system of claim 3, further comprising a rotatably mounted drive shaft operatively coupled to the motor for drive thereby, the pivotable mounting of the lead screw shaft comprising a universal joint rotatably coupling the lead screw shaft to the drive shaft, the lead screw shaft also being driven by the drive shaft.

5. The system of claim 4, wherein the motor is coupled to the drive shaft by a chain reduction drive.

6. The system of claim 1, wherein the rear wheel is dynamically suspended relative to the supporting structure.

7. The system of claim 1, wherein the controller comprises:

(a) first and second momentary pilot circuit paths for powering respective first and second gain circuits, the gain circuits being operatively connected for reversibly powering the motor from a D.C. source of electrical power in response to activation of corresponding ones of the circuit paths, the outrigger wheels being lowered by activation of the first pilot circuit path and raised by activation of the second pilot circuit path; and (b) first and second limit switch elements for interrupting corresponding ones of the pilot circuit paths, the first limit switch element being opened when the outrigger wheels reach the lowered position, the second limit switch element being opened when the outrigger wheels reach the raised position, the limit switch elements being connected for inhibiting corresponding ones of the pilot circuit paths for preventing overtravel of the outrigger wheels.

8. The system of claim 7, wherein the vehicle is powered by a vehicle drive for transport thereof, the pilot circuit paths being electrically powered only when the vehicle drive is enabled, the actuator mechanism in combination with the motor having sufficient drag and mechanical advantage whereby the outrigger wheels are locked from movement between the raised and lowered positions in the absence of electrical power to the motor.

9. A system for laterally stabilizing a two-wheeled vehicle having a steerable front wheel, a rear wheel, and a chassis connecting the front and rear wheels, the vehicle being powered by a vehicle drive for transport thereof, the system comprising:

(a) a support structure including a U-shaped frame member having leg portions rigidly attached to the vehicle chassis and a transverse portion located rearwardly of the rear wheel, a base member, and means for rigidly attaching the base member to the transverse portion of the frame member to form a substantially horizontal shelf portion extending rearwardly of the rear wheel;

(b) a pair of outrigger struts having respective outrigger wheels rotatably mounted at forward ends thereto in parallel spaced relation on opposite sides of the rear wheel, the outrigger wheels being vertically movably positionable between a raised position and a lowered position relative to the base member, the struts each being rigidly connected at their rearward ends by a laterally oriented strut shaft, the strut shaft being rotatably mounted transversely relative to the base member for providing in unison vertical movement of the outrigger wheels, the strut shaft extending behind the rear wheel on opposite sides thereof, the struts extending forwardly of the strut shaft;

(c) an electric motor supported by the base member;

(d) an actuator mechanism comprising:

(i) a rotatably mounted lead screw shaft operatively coupled to the motor for being driven thereby, the lead screw shaft being pivotably mounted relative to the base member;

(ii) a drive nut member threadingly engaging the lead screw shaft; and (iii) the lead screw shaft and the drive nut member being mechanically connected between the struts and the motor for driving the strut shaft and thereby pivoting the struts and the outrigger wheels between the raised and lowered positions in response to rotation of the lead screw shaft; and (e) a controller for electrically powering the electric motor for selectively positioning the outrigger wheels, the controller comprising:

(i) first and second momentary pilot circuit paths for powering respective first and second gain circuits, the gain circuits being operatively connected for reversibly powering the motor from a D.C. source of electrical power in response to activation of corresponding ones of the circuit paths, the outrigger wheels being lowered by activation of the first pilot circuit path and raised by activation of the second pilot circuit path, the pilot circuit paths being electrically powered only when the vehicle drive is enabled, the actuator mechanism in combination with the motor having sufficient drag and mechanical advantage whereby the outrigger wheels are locked from movement between the raised and lowered positions in the absence of electrical power to the motor; and (ii) first and second limit switch elements for interrupting corresponding ones of the pilot circuit paths, the first limit switch element being opened when the outrigger wheels reach the lowered position, the second limit switch element being opened when the outrigger wheels reach the raised position, the limit switch elements being connected for inhibiting corresponding ones of the pilot circuit paths for preventing overtravel of the outrigger wheels.

10. A system for laterally stabilizing a two-wheeled vehicle having a steerable front wheel, a rear wheel, and a chassis connecting the front and rear wheels, the system comprising:

(a) a support structure including a U-shaped frame member having leg portions rigidly attached to the vehicle chassis and a transverse portion located rearwardly of the rear wheel, a base member, and means for rigidly attaching the base member to the transverse portion of the frame member to form a substantially horizontal shelf portion extending rearwardly of the rear wheel;

(b) a laterally oriented strut shaft transversely rotatably mounted to the base member behind the rear wheel and extending on opposite sides thereof;

(c) a pair of outrigger struts having respective outrigger wheels rotatably mounted at forward ends thereto, the struts being rigidly connected at their rearward ends to the strut shaft for locating the outrigger wheels in parallel spaced relation on opposite sides of the rear wheel, the outrigger wheels being vertically movably positionable between a raised position and a lowered position relative to the base member upon rotation of the strut shaft (d) an electric motor mounted to the base member;

(e) an actuator mechanism mechanically connected between the motor and the strut shaft for driving the strut shaft and thereby pivoting the struts and the outrigger wheels in unison between the raised and lowered positions in response to activation of the motor; and (f) a controller for electrically powering the electric motor for selectively positioning the outrigger wheels.

\* \* \* \* \*